United States Patent [19]

McPherson

[11] Patent Number: 4,686,676
[45] Date of Patent: Aug. 11, 1987

[54] APPARATUS AND METHOD FOR DETERMINING TRUE DATA IN A DIGITAL DATA STREAM FROM DISTORTED DATA

[75] Inventor: Andrew D. McPherson, Cambridge, England

[73] Assignee: U.S. Philips Corporation, New York, N.Y.

[21] Appl. No.: 711,783

[22] Filed: Mar. 14, 1985

[30] Foreign Application Priority Data

Mar. 14, 1984 [GB] United Kingdom ............. 8406627

[51] Int. Cl.$^4$ .............................................. G06F 11/00
[52] U.S. Cl. .............................................. 371/36; 371/6; 307/464
[58] Field of Search .............. 371/6, 30, 35–36, 371/39, 61, 72; 307/464; 340/146.2; 375/10

[56] References Cited

U.S. PATENT DOCUMENTS

| | | | |
|---|---|---|---|
| 3,479,457 | 11/1969 | Oswald | 178/67 |
| 3,681,578 | 8/1972 | Stevens | 371/36 X |
| 3,859,655 | 1/1975 | Van Duuren | 340/347 DD |
| 4,225,961 | 9/1980 | Raggenbass et al. | 371/36 |
| 4,375,683 | 3/1983 | Wensley | 371/36 |
| 4,432,094 | 2/1984 | Das Gupta | 371/36 X |
| 4,442,531 | 4/1984 | Gupta | 371/36 X |
| 4,484,330 | 11/1984 | Moy | 371/36 |
| 4,584,673 | 4/1986 | Kuijk | 371/36 X |

FOREIGN PATENT DOCUMENTS

| | | | |
|---|---|---|---|
| 1258595 | 12/1971 | United Kingdom | 371/36 |
| 0585549 | 12/1977 | U.S.S.R. | 371/36 |
| 0656218 | 4/1979 | U.S.S.R. | 371/36 |

OTHER PUBLICATIONS

A. Ingle et al., "A Reliability Mode for Various Switch Designs in Hybrid Redundancy", *IEEE Transactions on Computers*, vol. C–25, No. 2, Feb. 1976, pp. 115–133.

J. Smith, *IBM Technical Disclosure Bulletin*, vol. 23, No. 4, Sep. 1980, pp. 1707–1709, "Recovery From Transient Errors in Redundant Systems".

P. Hodges, *IBM Technical Disclosure Bulletin*, vol. 23, No. 3, Aug. 1980, pp. 1220–1221, "Special Bit Pattern Detector Employing Majority Logic".

*Primary Examiner*—Gary V. Harkcom
*Attorney, Agent, or Firm*—Anne E. Barschall; Edward W. Goodman; William J. Streeter

[57] ABSTRACT

A method and circuit for estimating true data from distorted digital data signals which may have become degraded due to noise, in which signals are clocked into a shift register at a frequency rate higher than the data rate, for example eight times the data rate. The n outputs of the shift register stages are coupled to respective inputs of a majority logic circuit which has (n+1) inputs. A latching circuit clocked in antiphase to the clocking of the shift register is coupled to an output of the majority logic circuit. The output of the latching circuit is fed back to the (n+1)th input of the majority logic circuit.

11 Claims, 4 Drawing Figures

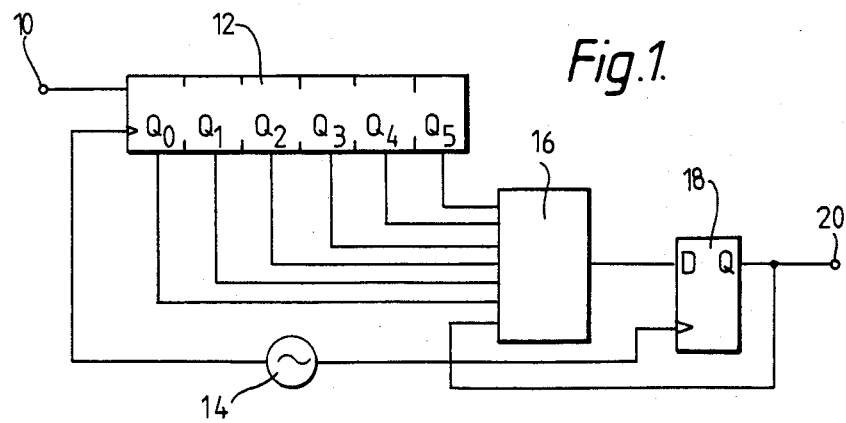
*Fig.1.*
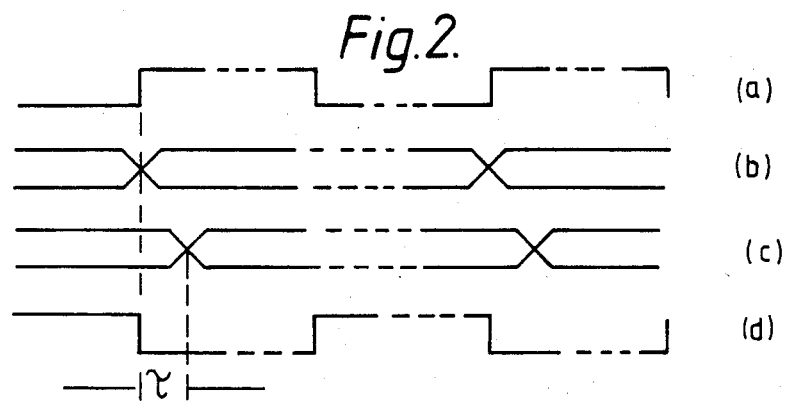
*Fig.2.*
*Fig.3.*
```
1 1 1 0 0 0 1 1 1                (a)
0 0 0 1 1 1 0 0 0                (b)
1 1 1 1 0 0 0 1 1 1 1            (c)
0 0 0 0 1 1 1 0 0 0 0            (d)
1 1 1 1 0 1 0 1 0 0 0 0 0        (e)
        1 1 1 1 1 0 0 0 0 0 0    (f)
```

APPARATUS AND METHOD FOR DETERMINING TRUE DATA IN A DIGITAL DATA STREAM FROM DISTORTED DATA

BACKGROUND OF THE INVENTION

The present invention relates to a method of, and a circuit for, estimating true data from distorted digital data signals which may have become distorted during transmission.

In systems involving the transmission of data, it is important to try to avoid the effects of data becoming sufficiently distorted so that falsing of the data occurs. For example, in a paging system if address data becomes distorted in transmission, then it is possible that the true addressee of the paging call is not alerted because the address information has become corrupted.

U.S. Pat. No. 3,479,457 discloses an apparatus for demodulating phase—or frequency—modulated signals by high speed coded signals. Faults, for example, degradations in the signal to be demodulated, are corrected by clocking the signal into a shift register at a higher frequency than the frequency of the signal to be demodulated. Then pairs of signals from the shift register are compared in an Exclusive-OR circuit and the result is fed to a second shift register having three stages. Different pairs of outputs of the second shift register are supplied to a majority logic circuit comprising three AND gates and three input OR gates connected to the output of each of the AND gates. If necessary this circuitry is duplicated to rectify further faults. A drawback to this known circuit is the amount of hardware involved in the majority logic stage if the number of samples is increased. For example, this cited specification states that if one stores five samples in the second shift register which now has five stages then to obtain a majority logic decision by considering different combinations of three samples, ten AND gates are required.

U.S. Pat No. 3,859,655 also discloses reforming of a signal by use a shift register and majority logic.

A drawback to these known systems is that an increasing number of circuit elements are required as the number of samples used in making a majority logic decision becomes greater. Accordingly, in situations where space and power consumption are of importance, such as in paging receivers, it is desirable to be able to make a reliable decision based on a smaller number of samples when estimating true data from distorted digital data signals.

SUMMARY OF THE INVENTION

According to one embodiment of the present invention a method is provided for estimating true data from distorted digital data signals, comprising successively sampling the digital signal at a clock frequency greater than that of the data rate, applying a plurality of n successive samples to a majority logic circuit having $(n+1)$ inputs, feeding back to the $(n+1)$th input a preceding majority logic circuit decision and repeating the operation by adding at least one new sample to, and discarding at least the longest held sample from, plurality of successive samples, the output of the majority logic circuit being used to determine the true value of the digital data signal.

According to another embodiment of the present invention a circuit is provided for estimating true data from distorted digital data signals, comprising a shift register having a plurality of n stages, each stage having an output, an input terminal connected to the shift register for applying digital data signals thereto, means for clocking the shift register at a frequency greater than the data rate, and a majority logic circuit having $(n+1)$ inputs, n inputs of which are coupled to respective outputs of the shift register stages, the $(n+1)$th input being coupled to a feedback connection which applies a preceding majority logic circuit decision thereto.

The method and circuit in accordance with the present invention not only enable an estimation of the true signal from a noisy or distorted digital signal but also enable the effective signal-to-noise ratio of the input signal to be improved.

By having feedback to the $(n+1)$th input of the majority logic circuit, fewer true samples have to be taken in order to correct a false one. If the number of samples taken is $(n+1)$, then the number of samples which can be corrected is $(n/2)$.

The circuit is independant of technology and the rate of sampling or clocking is optional although it is preferred to be about eight times the data rate.

The present invention will now be described, by way of example, with reference to the accompanying drawings, wherein:

BRIEF DESCRIPTION OF THE DRAWINGS

FIG. 1 is a block schematic circuit diagram of an embodiment of the present invention in which feedback is provided between the data output and an input to the majority logic circuit.

FIG. 2 shows four waveform diagrams referenced (a), (b), (c) and (d).

FIG. 3 shows different data signals, signals (a) and (b) are for use with a circuit with feedback, signals (c) and (d) are for use with a circuit without feedback, signal (e) is a distorted input signal and signal (f) is an output estimation of the true version of the distorted signal (e)

DESCRIPTION OF THE PREFERRED EMBODIMENT

Figure 4:
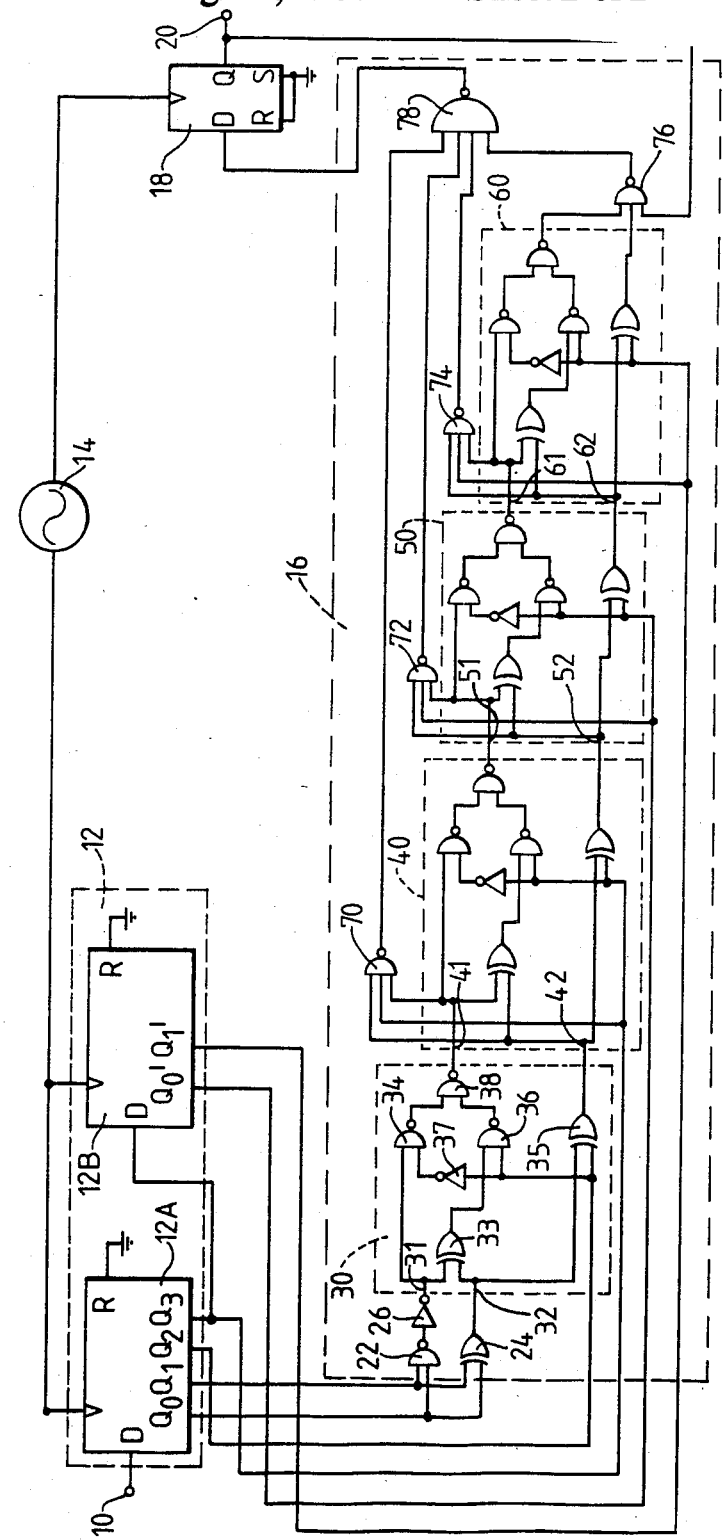
FIG. 4 is a schematic circuit diagram of an embodiment of the present invention.

Referring to FIG. 1 of the drawings, a data input signal is applied through an input terminal 10 to a six stage shift register 12 which is clocked at eight times the data rate by a clock signal generator 14. The outputs $Q_0$ to $Q_5$ of the shift register 12 are applied to respective inputs of a seven input majority logic circuit 16. An output of the circuit 16 is connected to a latching circuit 18 which is clocked in antiphase relative to the clocking of the shift register 12. An output of the latching circuit 18 is applied to an output terminal 20 and is also fed back to the seventh input of the circuit 16.

In operation the clock waveforms (a) and (d) of FIG. 2 are applied to the clock inputs of the shift register 12 and the latching circuit 18, respectively, both of which are clocked on a low to high transition as indicated by the arrows applied to these transitions. The data signal, waveform (b) of FIG. 2, is applied to the input terminal 10. The value of the input signal when sampled is stored serially in the shift register 12. The outputs $Q_0$ to $Q_5$ of the respective stages of the shift register 12 are applied to the majority logic circuit 16 together with the output of the latch circuit 18. As the circuit 16 has an odd number of inputs there will always be a majority decision output. Thus if three inputs are "1"s and the three others are "0"s then the output will be dependent on the output of the latch 18. If this output is a "1" then the majority output will be a "1" and conversely if it is a "0" then the majority output will be a "0". In effect the output produced by the latch 18 in one clock cycle influences the majority decision in the next following clock cycle. When the clock input to the latch 18 next goes high the majority decision of the circuit 16, waveform (c) in FIG. 2, is stored. There is a majority logic circuit propagation delay $\tau$ between the transitions in the data and the majority logic decision.

The number of input signal errors which can be corrected is related to the number (n+1) of the inputs to the majority logic circuit 16 and is defined generally as [(n)/2]. In the case of n=6 then three error bits can be corrected, for example in FIG. 3(a) the three "0"s will be corrected to all "1"s and conversely in FIG. 3(b) the three "1"s will be corrected to all "0"s.

If feedback from the output of the latching circuit 18 to the seventh input of the majority logic circuit is not provided, then in order to be able to correct three errors, a seven stage shift register would be required. Thus the number of shift register stages and the number of majority logic circuit inputs equals an odd number (n+1). FIGS. 3(c) and 3(d) illustrate that in order to correct three successive errors, that is the "0"s in FIG. 3(c) and the "1"s in FIG. 3(d), it is necessary to have four correct digits before and after the erroneous ones as opposed to three correct digits before and after the erroneous ones as shown in FIGS. 3(a) and 3(b).

FIG. 3(e) illustrates a signal having a distorted transition from 1 to 0 and FIG. 3(f) illustrates how this signal can be estimated by the circuit in accordance with the present invention so that there is a single transition from "1" to "0".

FIG. 4 is a schematic circuit diagram of an embodiment of the present invention having a feedback connection between the output of the latching circuit 18 and the majority logic circuit 16. In this embodiment the latching circuit 18 comprises part of an integrated circuit type CD 4013 and the shift register 12 comprises two six stage shift register integrated circuits 12A, 12B of type CD 4015, both of these integrated circuit types being manufactured by the Radio Corporation of America. The majority logic circuit 16 is constituted by a plurality of NAND-gates, EX-OR gates and inverters.

For convenience of description circuit 16 may be regarded as comprising four identical modules 30, 40, 50 and 60 and several other components. Only the module 30, will be described in detail.

Outputs $Q_0$ and $Q_1$ of the shift register circuit 12A are connected to the inputs of a NAND gate 22 and an EX-OR gate 24. The output of the NAND gate 22 is inverted by an inverter 26 and is applied as one (31) of two inputs to the module 30, the other (32) of the two inputs being the output of the EX-OR gate 24.

The input 31 is applied to an EX-OR gate 33 and a NAND gate 34 and the other input 32 is applied to the EX-OR gate 33 and an EX-OR gate 35. The output of the EX-OR gate 33 is applied as an input to a NAND gate 36. An output $Q_2$ of the shift register circuit 12A is connected as an input to the EX-OR gate 35 and the NAND gate 36, and, through an inverter 37, to the NAND gate 38. An output of the NAND gate 38 and an input of the EX-OR gate 35 comprise, respectively, inputs 41 and 42 of the module 40. A third input to the module 40 comprises the output $Q_3$ of the shift register circuit 12A. These three inputs are applied as respective inputs to a NAND gate 70 whose output comprises one input of a four input NAND gate 78.

The outputs of the module 40 are applied as inputs 51 and 52 of the module 50. Additionally an output $Q_0'$ of the shift register circuit 12B is applied as a third input to the module 50. These three inputs are also applied to a NAND gate 72 whose output is connected to a second input of the NAND gate 78.

In a similar manner the outputs of the module 50 comprise inputs 61 and 62 of the module 60 whose third input is the output $Q_1'$ of the shift register circuit 12B. These three inputs are connected to a NAND gate 74 whose output comprises a third input of the NAND gate 78.

The two outputs of the module 60 together with the feedback connection from the output of the latch 18 are applied to a NAND gate 76 whose output comprises a fourth input of the NAND gate 78. The output of the NAND gate 78 is connected to the data input D of the latch 18.

As an example of the operation of the majority logic circuit 16, it can be shown that in the event of shift register outputs $Q_0$, $Q_1$ and $Q_2$ being "1" and the outputs $Q_3$, $Q_0'$, and $Q_1'$ being "0" then the binary value of the feedback signal determines whether the output or the latch, when clocked, will be a "1" or a "0".

In the event of not having a feedback input, then it will be necessary to have an extra module in the circuit 16 together with a further output from the shift register 12.

I claim:

1. A method of estimating true data from a distorted data signal having a given frequency comprising the steps of:
   (a) successively sampling the distorted digital data signal at a clock frequency greater than the frequency of said distorted digital data signal;
   (b) holding a plurality of n successive samples derived from the sampling step, said n successive samples having an order from longest to shortest time held;
   (c) applying the n successive samples to n inputs of a majority logic circuit having (n+1) inputs;
   (d) feeding back to the (n+1)st input of said majority logic circuit an output signal of said majority logic circuit, said output signal of said majority logic circuit, when received at said (n+1)st input, representing an immediately preceding decision of said majority logic circuit;
   (e) discarding at least one longest held sample from said n successive samples;
   (f) holding at least one next successive sample from said sampling step; and
   (g) repeating steps c–f;
   (h) whereby said output signal of said majority logic circuit is used during each repetition of step (d) to successively determine a majority decision for each succeeding plurality of n successive samples.

2. The method of claim 1 wherein n is an even number, whereby in the case where half of the first n inputs have a first binary value and the other half of the first n inputs have a second binary value, the immediately preceding decision of the majority logic circuit determines a current majority logic circuit decision.

3. The method of claim 1 wherein the clock frequency of said sampling step is at least eight times the frequency rate of said distorted digital data signal.

4. The method of claims 1, 2, or 3 comprising the steps of:

(a) latching the output signal of said majority logic circuit in a latching circuit prior to each repeating feeding back step;

(b) applying an output of said latching circuit to said (n+1)st input of said majority logic circuit in the next feeding back step after each repeating step.

5. A circuit for estimating true data from a distorted digital data signal having a given frequency, comprising:

(a) a shift register having a plurality of n stages, each said stage of said register having an output, said shift register having one input for receiving the distorted digital data signal, and a clock input, (b) means for clocking said clock input of said shift register at a frequency greater than the frequency rate of said distorted digital data signal, and (c) a majority logic circuit having (n+1) inputs, n inputs of which are coupled to respective outputs of said shift register stages, the (n+1)st input being coupled to a feedback connection which receives an output signal from an output of said majority logic circuit said output signal of said majority logic circuit, when received at said (n+1)st input, representing an immediately preceding decision of said majority logic circuit.

6. A circuit as claimed in claim 5, further comprising a latching circuit having one input connected to said output of said majority logic circuit and another input connected to said clocking means.

7. A circuit as claimed in claim 6, wherein said feedback connection is connected to an output of said latching circuit.

8. The circuit of claim 5 comprising a single shift register.

9. The circuit of claim 8 wherein said inputs of said majority logic circuit are directly connected to said respective outputs of said shift register.

10. The circuit of claim 5 further comprising means for delaying having one input coupled to receive said output signal of said majority logic circuit and a clock input and having an output coupled to said (n+1)st input of said majority logic circuit, said delaying means being clocked so that said output signal of said majority logic circuit is received at said (n+1)st input representing an immediately preceding decision.

11. The circuit of claim 10 wherein said delaying means is clocked out of phase with clocking of said shift register.

* * * * *